United States Patent
Neuerburg et al.

(10) Patent No.: US 6,311,464 B1
(45) Date of Patent: Nov. 6, 2001

(54) MOWING MACHINE

(75) Inventors: Horst Neuerburg; Fernand Kieffer, both of Saverne (FR)

(73) Assignee: Kuhn S.A., Saverne (FR)

( * ) Notice: Subject to any disclaimer, the term of this patent is extended or adjusted under 35 U.S.C. 154(b) by 0 days.

(21) Appl. No.: 09/597,466

(22) Filed: Jun. 19, 2000

(30) Foreign Application Priority Data

Jun. 17, 1999 (FR) .................................................. 99 07871

(51) Int. Cl.[7] .................................................. A01D 34/66
(52) U.S. Cl. .................................................. 56/15.2; 56/6
(58) Field of Search .......................... 56/1, 6, 15.1, 15.2, 56/15.8, 15.9, 16.3, 13.5, 17.4, 320.1, 16.4 R, DIG. 15, DIG. 20

(56) References Cited

U.S. PATENT DOCUMENTS

| | | |
|---|---|---|
| 4,343,138 | 8/1982 | Neuerburg . |
| 4,426,828 | 1/1984 | Neuerburg . |
| 4,443,998 | 4/1984 | Neuerburg . |
| 4,452,034 | 6/1984 | Neuerburg . |
| 4,809,488 | 3/1989 | Neuerburg et al. . |
| 4,879,870 | 11/1989 | Neuerburg . |
| 4,896,493 | 1/1990 | Neuerburg . |
| 4,922,693 | 5/1990 | Neuerburg . |
| 4,970,848 | 11/1990 | Neuerburg et al. . |
| 4,999,981 | 3/1991 | Neuerburg . |
| 5,241,809 | 9/1993 | Wolff et al. . |
| 5,566,537 | 10/1996 | Kieffer et al. . |
| 5,660,032 | 8/1997 | Neuerburg et al. . |
| 5,727,371 | 3/1998 | Kieffer et al. . |
| 5,852,921 | 12/1998 | Neuerburg et al. . |
| 5,896,733 | 4/1999 | Neuerburg et al. . |
| 5,934,050 | 8/1999 | Neuerburg et al. . |
| 5,966,913 | 10/1999 | Neuerburg . |

FOREIGN PATENT DOCUMENTS

| | | |
|---|---|---|
| 2 400 894 | 7/1974 | (DE) . |
| 0 809 928 | 12/1997 | (EP) . |
| 0 880 879 | 12/1998 | (EP) . |
| 2 584 889 | 1/1987 | (FR) . |

Primary Examiner—Robert E. Pezzuto
(74) Attorney, Agent, or Firm—Oblon, Spivak, McClelland, Maier & Neustadt, P.C.

(57) ABSTRACT

A mower comprising a cutting mechanism which, during work, extends transversely to a direction of work, a hitching structure connected to a motor vehicle, a carrying beam connected, on one hand, to the cutting mechanism by a first articulation and, on another hand, to the hitching structure by a second articulation and of a third articulation, which allows the second articulation to pivot with respect to the hitching structure, a device, for moving the carrying beam and the cutting mechanism between at least one transport position and one other position, and vice versa, and a lifting member for moving the carrying beam and the cutting mechanism between a work position and a maneuvering position, wherein the lifting member is associated with a damping member for absorbing abrupt movements of the carrying beam with respect to the hitching structure when the carrying beam is in the maneuvering position or respectively in the transport position.

22 Claims, 5 Drawing Sheets

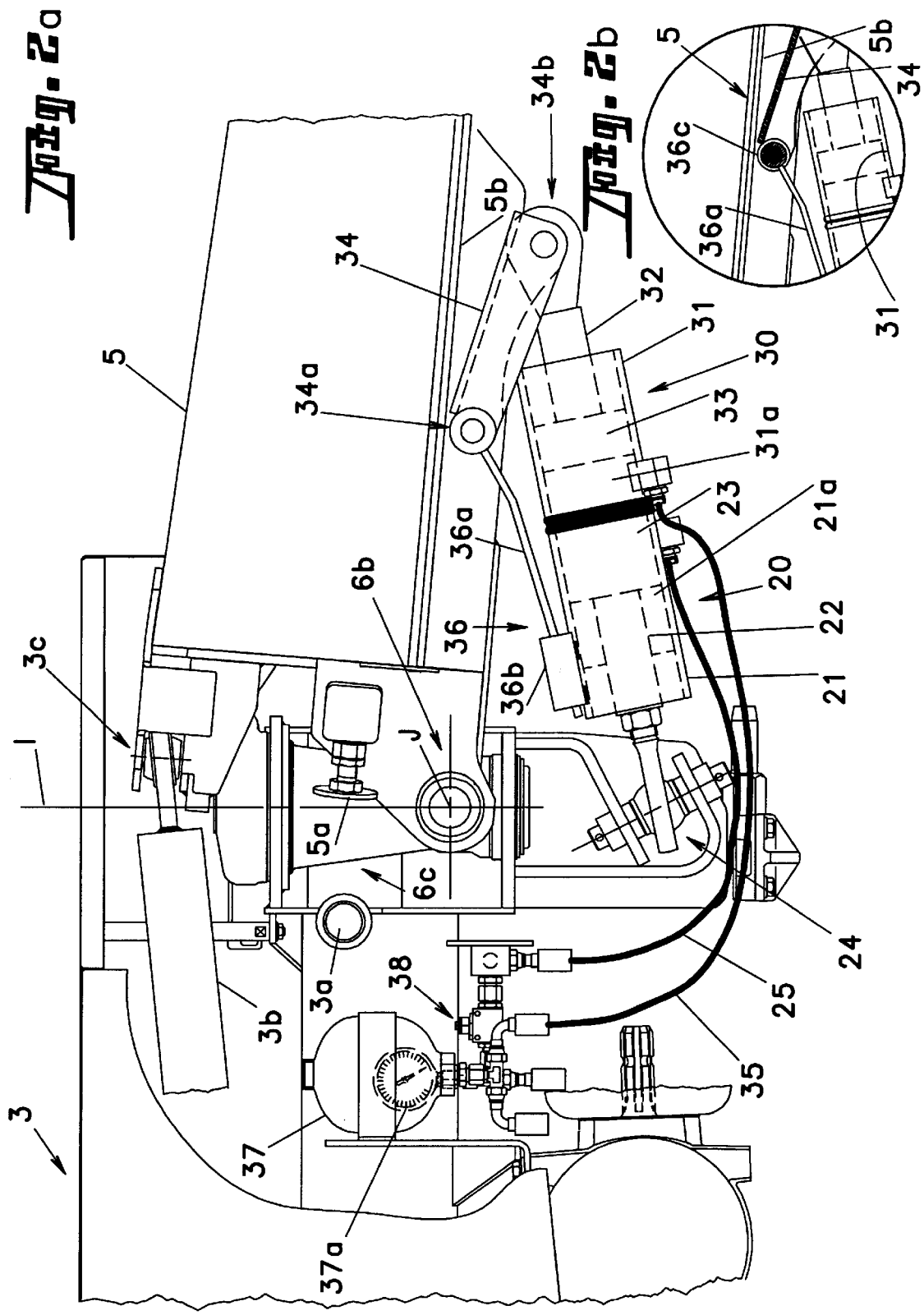

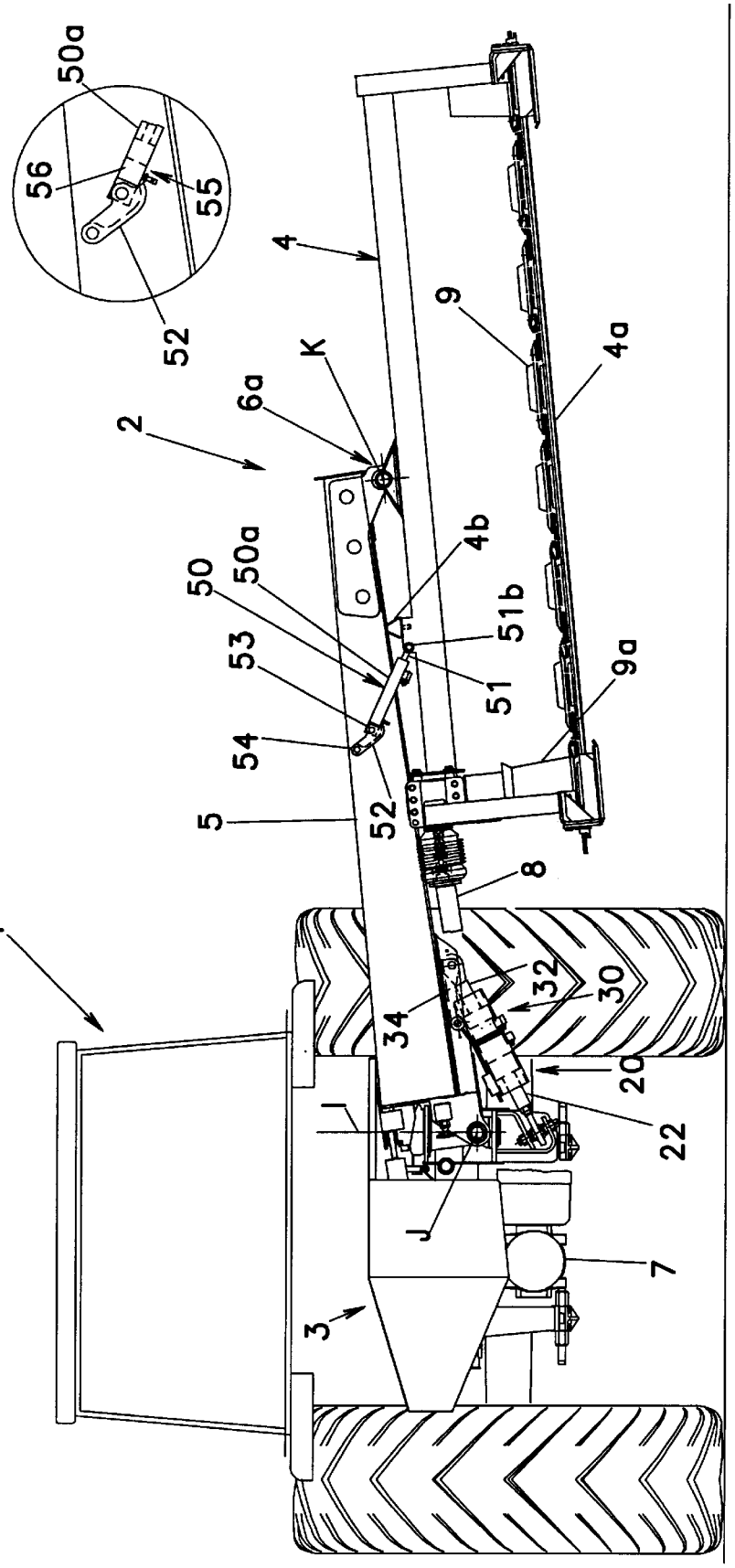

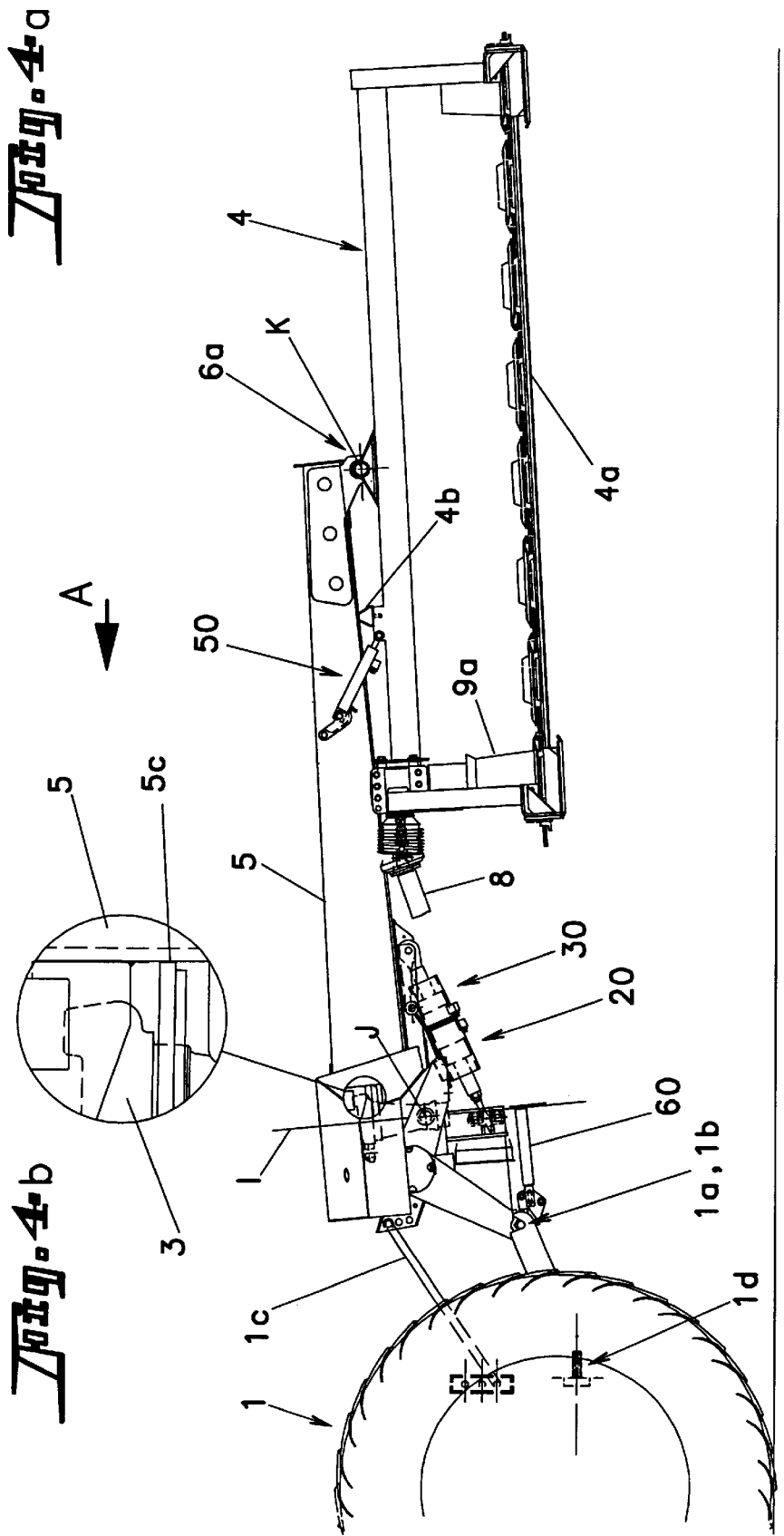

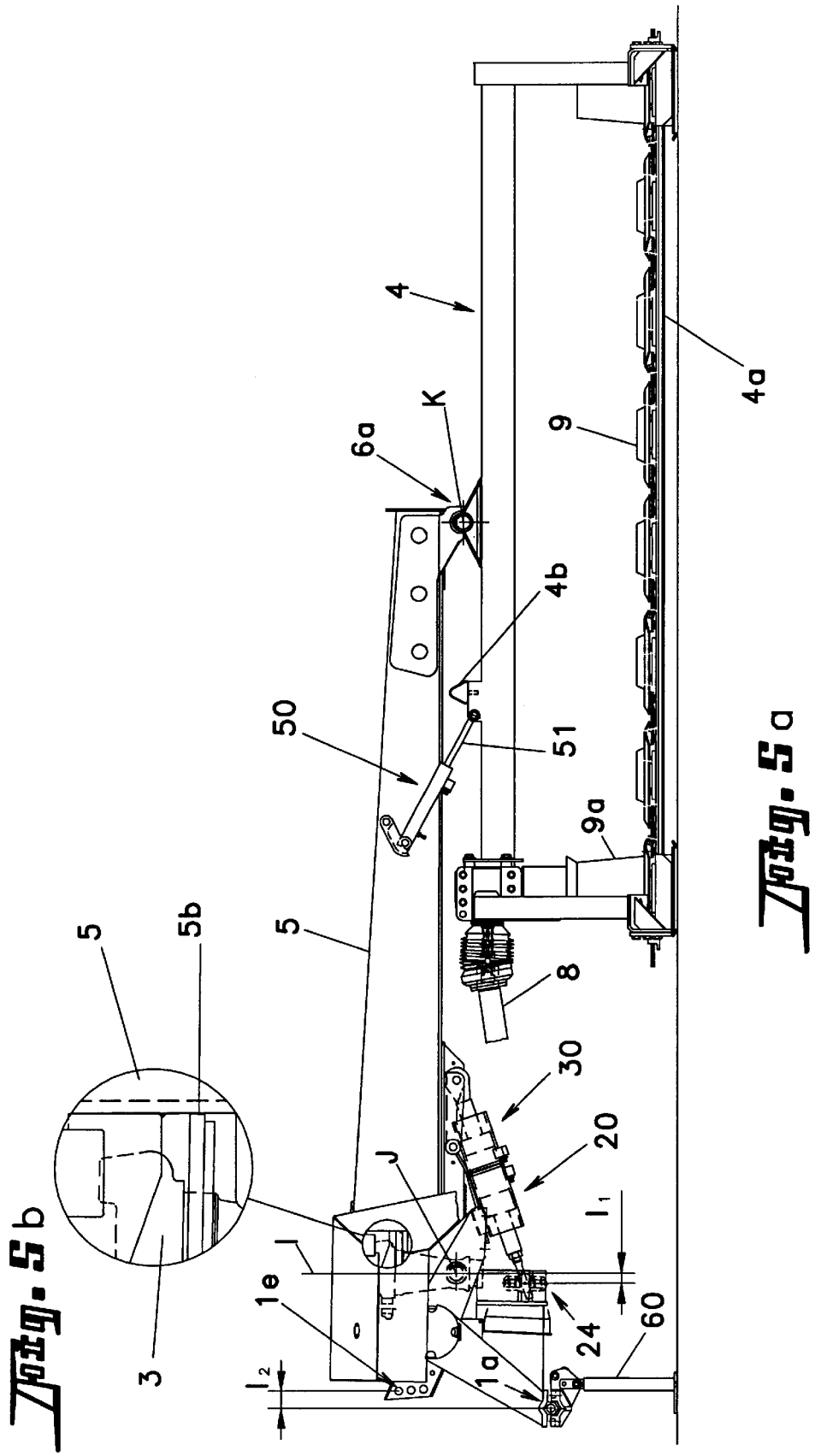

MOWING MACHINE

BACKGROUND OF THE INVENTION

1. Field of the Invention

The present invention relates to the technical field of agricultural machinery and relates in particular to the field of implements of the mower or mower-conditioner type. The present invention is more specifically aimed at a mower or mower-conditioner intended to be attached to the lifting system of a tractor. Such implements are generally equipped with a cutting mechanism which folds vertically upward or longitudinally backward for transport by road. The implements in question may therefore be moved into a transport position. The cutting mechanism of an implement such as this is preferably able to pivot between a transport position and at least one work position. In what follows, allusion will be more specifically made to a disk mower, but the invention is not restricted to this particular example of mower. Other implements, such as drum-type or reciprocating mowers, would not be departing from the scope of the present invention.

2. Discussion of the Background

The production of a mower comprising:

a cutting mechanism which, during work, extends transversely to the direction of work, a hitching structure intended to be connected to a motor vehicle, a carrying beam connected, on one hand, to the cutting mechanism by means of a first articulation, the axis of which is directed forward, and, on another hand, directly or indirectly to the hitching structure by means of a second articulation, the axis of which is directed forward and of a third articulation, the axis of which is directed upward, which allows the second articulation to pivot with respect to the hitching structure, positioning means acting on the carrying beam to allow said carrying beam and the cutting mechanism to be moved simultaneously between at least one transport position and one other position, and vice versa, by pivoting of the carrier beam and of the cutting mechanism about the axis of the third articulation, and a lifting member acting on the carrying beam to allow said carrying beam and the cutting mechanism to be moved simultaneously between a work position and a maneuvering position, is known.

Specifically, this known mower can be placed in a transport position in which the carrying beam and the cutting mechanism are pivoted horizontally backward, using positioning means.

The lifting member consists of a hydraulic ram mounted between the hitching structure and the carrying beam, so as to raise the cutting mechanism for headland maneuvers. The tractor lifting system supporting the hitching structure therefore remains in the same position with respect to the tractor. For cutting operations, the lifting member allows the cutting mechanism to be rested down on the ground. The cutting mechanism is then in a work position.

Such known mowers seem to be fairly sensitive to the unevennesses of the ground over which the tractor is moving with the cutting mechanism in the raised maneuvering or transport position. The jolts and abrupt movements of the cutting mechanism may be transmitted directly to the hitching structure and to the carrying beam. Certain articulations and parts are therefore very highly loaded and this often gives rise to damage or premature wear, especially when the mower is in the transport position.

It is also known practice, from document EP 0 880 879, to produce a mower comprising a hitching structure connected to a motor vehicle by means of an upper hitching point and two lower hitching points. One of the lower hitching points is connected to a device which allows the hitching structure to be moved with respect to said lower hitching point. The device, in this specific instance a hydraulic ram connected to a nitrogen chamber, allows the mower to be moved from a work position into a raised position and vice versa. The device described also makes it possible to achieve damping when the mower is in a raised position. By contrast, this damping function is no longer fulfilled when the mower is in the transport position.

SUMMARY OF THE INVENTION

The object of the present invention is therefore to overcome the drawbacks of the state of the art by limiting the effects of the jolts and abrupt movements experienced by the mower, particularly the hitching structure, independently of the positioning of the cutting mechanism.

The objects assigned to the present invention are achieved using a mower wherein the lifting member is associated with a damping member acting on the carrying beam so as, in particular, to absorb the abrupt movements of said carrying beam and of the cutting mechanism with respect to the hitching structure when said carrying beam and said cutting mechanism are in the maneuvering position and respectively in a transport position.

The mower according to the invention is noteworthy in so far as, in one embodiment, the lifting member and the damping member are mounted directly or indirectly between the hitching structure and the carrying beam.

Furthermore, the mower according to the invention may comprise a means locking the pivoting of the cutting mechanism the axis of the first articulation.

The mower according to the invention may also comprise a means of lightening the cutting mechanism to make it possible to reduce the pressure with which said cutting mechanism rests on the ground. This lightening means acts directly or indirectly between the hitching structure and the carrying beam.

The lifting member and the damping member are, for example, mounted in series.

Advantageously, the positioning means are capable of pivoting the carrying beam and the cutting mechanism approximately horizontally backward.

BRIEF DESCRIPTION OF THE DRAWINGS

Other features and advantages of the present invention will become apparent from the detailed description given hereinafter by way of example with reference to the appended figures, in which:

FIG. 2*a* depicts a partial and enlarged view of part of the mower according to the invention, FIG. 2*b* depicts a partially sectioned detail of FIG. 2*a*, FIG. 3*a* depicts a mower according to the invention, in a raised maneuvering position, FIG. 3*b* depicts a detail of FIG. 3*a*, FIG. 4*a* depicts a mower according to the invention, in a transport position, FIG. 4b depicts an enlarged detail of FIG. 4a, FIG. 5a depicts a mower according to the invention, disconnected from the lifting system of a tractor, FIG. 5b depicts an enlarged detail of FIG. 5a.

DESCRIPTION OF THE PREFERRED EMBODIMENTS

Figure 1:
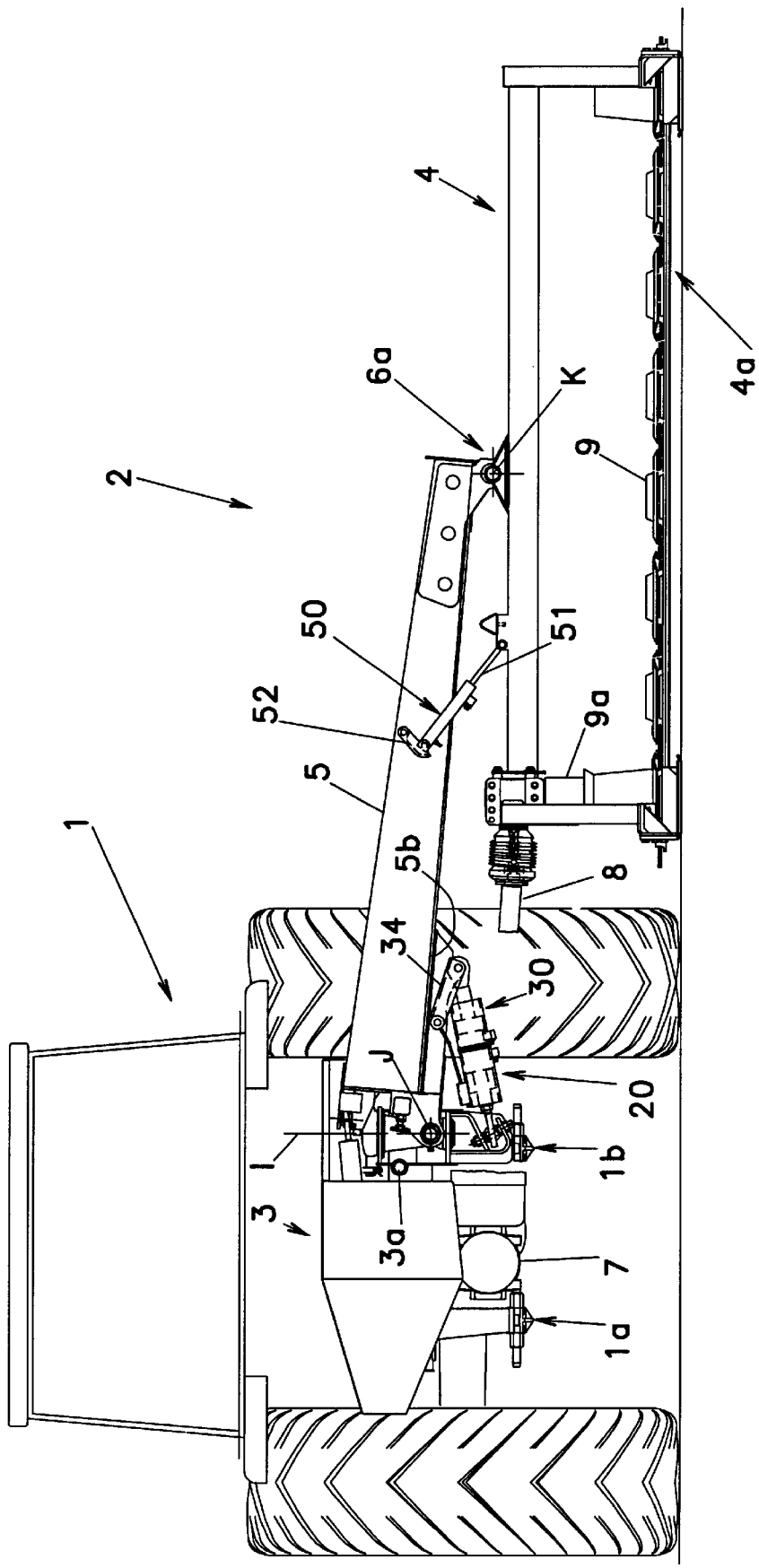
FIG. 1 depicts one embodiment of a mower according to the invention, in a work position.

FIG. 1 depicts a tractor 1 to which is coupled one embodiment of a mower 2 according to the invention. The mower 2 comprises a hitching structure 3 intended to be coupled to the lifting system of the tractor 1, particularly to the lower hitching points 1a, 1b and to an upper hitching point.

The mower 2 also comprises a cutting mechanism 4 suspended from a carrying beam 5 by means of a first articulation 6a, the axis K of which is directed forward. This first articulation 6a constitutes, for example, a suspension of the pendulum type, allowing the cutting mechanism 4 to conform to the unevennesses of the ground.

The mower 2 also comprises a transmission box 7, mounted on the hitching structure 3, allowing a rotational movement to be transmitted, in an inclined direction, for example at right angles, from a power take-off 1d (FIG. 4b) belonging to the tractor 1 to the cutting mechanism 4. The rotational movement transmitted by the power take-off 1d of the tractor 1 thus allows the cutting mechanism 4 to be driven via a transmission shaft 8 directed substantially at right angles to the output shaft of the power take-off 1d of the tractor 1, when the mower 2 is in the work or maneuvering position.

The transmission shaft 8 is only partially depicted in the figures for reasons of clarity, and it is obvious that said transmission shaft 8 runs from the transmission box 7 to the cutting mechanism 4.

The transmission shaft 8 is connected to a cutterbar 4a supporting, for example, disks 9 which are driven in rotation by a connecting member 9a. The way in which the disks 9 or other cutting members are driven is known per se.

The mower 2 according to the invention also comprises positioning means acting on the carrying beam 5 to move the cutting mechanism 4 between at least one transport position and one other position, for example a work position. The latter position is depicted in FIG. 1 and corresponds to a lateral positioning of the cutting mechanism 4 with respect to the direction of forward travel A (FIG. 4a) of the tractor 1. The direction of forward travel A is at right angles to the plane of FIG. 1, which shows the tractor 1 and the mower 2 viewed from the rear. The movement of the cutting mechanism 4 occurs jointly with that of the carrying beam 5.

The mower 2 according to the invention is also equipped with a lifting member 20 for simultaneously moving the cutting mechanism 4 and the carrying beam 5 between a lowered position (FIG. 1) and a maneuvering position. The latter, for example depicted in FIG. 3a, corresponds to a position which is raised by comparison with a work position and allows for easy passage over the windrows of cut harvested products.

The lifting member 20 is therefore advantageous in so far as it allows the carrying beam 5 and the cutting mechanism 4 to be raised so as to perform maneuvers at the headland. The lifting member 20 replaces the actuation of the lifting system supporting the hitching structure 3. The latter therefore remains in an optimum position with respect to the tractor 1 throughout the cutting and maneuvering operation.

The lifting member 20 is furthermore associated with a damping member 30 for absorbing the abrupt movements of the cutting mechanism 4 and of the carrying beam 5. The damping member 30 absorbs the abrupt movements experienced by the cutting mechanism 4 and the carrying beam 5 when said cutting mechanism 4 is in the transport position or in the maneuvering position. The lifting member 20 and the damping member 30 are advantageously mounted directly or indirectly between the hitching structure 3 and the carrying beam 5, as shown by FIGS. 1 to 5. The lifting member 20 and the damping member 30 are preferably mounted in series.

FIG. 2a depicts a view of part of the mower 2 according to the invention. The positioning means comprise, for example, a hydraulic ram, not depicted in FIG. 2a, allowing the carrying beam 5 and the cutting mechanism 4 to be placed in a transport position starting from a maneuvering or work position. The hitching structure 3 is therefore equipped with means, known per se, for pivoting the carrying beam 5 about an approximately vertical axis I by means of a third articulation 6c.

Advantageously, the mower 2 also comprises a means of lightening the cutting mechanism 4 so as to control the reaction of the ground on the cutting mechanism 4 when the latter is resting on the ground during work. The lightening means is advantageously made of an oleopneumatic lightening ram 3b. The latter is mounted between the hitching structure 3 and the carrying beam 5. Controlling the pressure with which the cutting mechanism 4 rests on the ground allows it to conform to the ground. This is achieved in a known manner using the way in which the carrying beam 5 is mounted on the hitching structure 3. The carrying beam 5 is mounted on the hitching structure 3 in particular using a second articulation 6b, the axis of pivoting J of which is approximately orthogonal to the axis I. Thus, by increasing the oil pressure in the lightening ram 3b, the latter tends to pull on the carrying beam 5, via a ball-joint articulation 3c. The lightening ram 3b therefore exerts a torque on the carrying beam 5 with respect to the axis of pivoting J so as to reduce the reaction of the ground on the cutting mechanism 4.

The axis of pivoting J is therefore made to rotate in a plane approximately orthogonal to the axis I as the carrying beam 5 is tilted between a transport position and a work position or vice versa. The transport position is delimited, for example, using stops 3a, 5a secured respectively to the hitching structure 3 and to the carrying beam 5.

The lifting member 20 also allows the carrying beam 5 to be pivoted about the axis of pivoting J, particularly by raising said carrying beam 5 for headland maneuvers or for transport by road.

The lifting member 20 consists of a hydraulic ram which has a first cylinder 21 delimiting a first chamber 21a in which a first ram rod 22 moves. This rod ends in a first piston 23 to delimit the volume accessible to the oil arriving from a hydraulic source belonging to the tractor 1 or an independent hydraulic source. In the example depicted in FIG. 2a, the first piston 23 is at the end of its travel in the first chamber 21a. This corresponds to all of the oil initially contained in the first chamber 21a having been discharged. The latter is therefore connected to tank.

A situation such as this arises when the cutting mechanism 4 and the carrying beam 5 are in the work position. In this case, the lightening ram 3b is active. The damping member 30 consists of an oleopneumatic ram which has a second cylinder 31 delimiting a second chamber 31a in which a second rod 32 moves. The latter ends in a second piston 33 to delimit the volume accessible to the oil arriving from a hydraulic source.

The first cylinder 21 and the second cylinder 31 are, for example, secured together by any known means.

The hydraulic lifting ram 21–22–23 and the oleopneumatic damping ram 31–32–33 are made with a common body which has two chambers 21a, 31a. The first rod 22, emerging from one 21a of the chambers 21a; 31a, is articulated directly or indirectly to the hitching structure 3 and the second rod 32, emerging from the other chamber 31a, is articulated directly or indirectly to the carrying beam 5.

Advantageously, the first rod 22 is that of the hydraulic lifting ram 21–22–23 and the second ram rod 32 is that of the oleopneumatic damping ram 31–32–33.

The first rod 22 is mounted on the hitching structure 3, for example using a ball-joint articulation 24.

The second ram rod 32 is connected to the carrying beam 5 by means of a connecting rod 34 mounted so that it can pivot on said carrying beam 5 and capable of bearing against an additional stop 5b secured to said carrying beam 5.

According to a preferred embodiment, the second ram rod 32 is articulated to the connecting rod 34, itself articulated to the carrying beam 5. The connecting rod 34 thus makes the connection between the second rod 32 and the beam 5 and does so by means of articulations 34a, 34b of the cylindrical type. The connecting rod 34 is mounted on the carrying beam 5 so as to bear, as appropriate, against the additional stop 5b.

The first chamber 21a and the second chamber 31a are supplied respectively by hydraulic pipes 25 and 35 which are connected to a hydraulic source via distribution members 38.

When the pipe 25 is under pressure, the oil enters the first chamber 21a, displacing the first piston 23. The latter therefore causes the first rod 22 to emerge at least partially from said first cylinder 21. The extending of the hydraulic lifting ram 21–22–23 allows the carrying beam 5 and therefore the cutting mechanism 4 to be raised.

It is obvious that the Connecting rod 34 rests against the additional stop 5b to raise the carrying beam 5. This corresponds to a position for maneuvering or transporting the mower 2.

When the pipe 25 is connected to tank, the oil contained in the first chamber 21a is discharged by the piston 23 under the effect of the weight of the assembly consisting of the carrying beam 5 and the cutting mechanism 4. This then is similar to the situation depicted in FIG. 2a. This corresponds to a work position for the cutting mechanism 4, that is to say a position in which said cutting mechanism 4 rests on the ground to a greater or lesser extent which depends on the pressure in the lightening ram 3b.

The cutting mechanism 4 may, for example, encounter an obstacle or an unevenness and lift with respect to its initial work position. The connecting rod 34 then no longer rests against the additional stop 5b. The connecting rod 34 therefore makes it possible to avoid a tension on the hydraulic lifting ram 21–22–23, which tension would consequently displace the first cylinder 21 and cause oil to be drawn into the first chamber 21a since the first rod 22 is retained by the ball-joint articulation 24. When the unevennesses of the ground so permit, the carrying beam 5 and therefore the cutting mechanism 4 can return to the initial work position in which the connecting rod 34 bears against the additional stop 5b. The cutting mechanism 4 thus conforms to the unevennesses of the ground under the control of the lightening ram 3b.

Advantageously, the first cylinder 21 is fitted with a rotation-preventing system 36 produced by any means for preventing the common body 21–31 from rotating on itself about their axis.

The rotation-preventing system 36 comprises, for example, a rod 36a, one of the ends of which is engaged in a tubular piece 36b secured to the first cylinder 21. FIG. 2b, which is partially in section, depicts the other end of the rod 36a and more specifically the way in which it is mounted on the carrying beam 5. For example, the other end of the rod 36a is equipped with a ring 36c mounted on the axis of the cylindrical articulation 34a.

The oleopneumatic damping ram 31–32–33 is connected to an expansion vessel 37 containing an inert gas of the nitrogen type. The expansion vessel 37 communicates with a pressure indicating member 37a and with the second chamber 31a by means of the distribution members 38 and of the pipe 35. These latter, for example, when the mower 2 is brought into service, allow the second chamber 31a and the expansion vessel 37 to be placed in communication with a hydraulic source and make it possible for a pressure corresponding to the desired amount of damping to be applied thereto.

The normal position of the second rod 32 therefore corresponds to maximum extension of the oleopneumatic damping ram 31–32–33.

When the carrying beam 5 is in a raised position with respect to the work position or is in a transport position, the distribution members 38 allow the hydraulic lifting ram 21–22–23 to be kept at maximum extension. Any jolt or abrupt movement experienced by the carrying beam 5 and the cutting mechanism 4 is then transmitted to the second cylinder 31. The second piston 33 is then made to move in the second chamber 31a and to at least partially expel the oil contained in the second chamber 31a to the expansion vessel 37 containing pressurized nitrogen. This controlled expulsion takes place through the distribution members 38 and thus allows the movement of the subassembly consisting of the carrying beam 5 and cutting mechanism 4 to be damped.

The superpressure in the expansion vessel 37 corresponding to the compression of the nitrogen then allows the second piston 33 to return to its initial position in the second cylinder 31, damping the movement of the cutting mechanism 4.

FIG. 3a depicts the mower 2 according to the invention in a raised maneuvering position. The cutting mechanism 4 and the carrying beam 5 extend approximately orthogonally to the direction of forward travel A. The hydraulic lifting ram 21–22–23 is at maximum extension and the oleopneumatic damping ram 31–32–33 is ready to damp the abrupt movements to which the cutting mechanism 4 and the carrying beam 5 are subjected.

According to the embodiment depicted in FIG. 3a, the mower 2 comprises a means 50 for locking the pivoting of the cutting mechanism 4 about the axis K of the first articulation 6a. The cutting mechanism 4 can therefore maintain an optimum orientation with respect to the ground.

The locking means 50 comprises, for example, an additional hydraulic ram 50a mounted directly or indirectly between the cutting mechanism 4 and the carrying beam 5. In order not to overburden the figures, the supply pipes for the additional hydraulic ram 50a have not been depicted.

When the mower 2 is in the raised maneuvering position, the additional hydraulic ram 50a is at maximum retraction, so as to best raise that part of the cutting mechanism 4 which is located closest to the hitching structure 3. In FIG. 3a, that corresponds to that part of the cutting mechanism 4 which is located to the left of the first articulation 6a. Furthermore, the cutting mechanism 4 is equipped with an additional stop 4b which bears against the carrying beam 5 under the effect of a maximum retraction of the additional hydraulic ram 50a. The latter has a rod 51 mounted on the cutting mechanism 4 by means of a corresponding articulation 51b. The mower 2 according to the invention therefore makes it easier to pass over the windrows when performing maneuvers at the headland, thanks to improved ground clearance and the fact that the cutting mechanism 4 is prevented from pivoting.

Advantageously, the additional hydraulic ram 50a is articulated to the carrying beam 5 by means of a link rod 52.

The link rod 52 is mounted so that it can pivot on the carrying beam 5 and on the additional hydraulic ram 50a.

The link rod 52 advantageously provides the connection between the cylinder of the additional hydraulic ram 50a and the carrying beam 5, by means of respective articulations 53, 54.

According to one embodiment of the mower 2 according to the invention, the hydraulic lifting ram 21–22–23 and the additional hydraulic ram 50a are supplied in parallel so as to cause said hydraulic lifting ram 21–22–23 to extend and said additional hydraulic ram 50a to shorten. By contrast, when the cutting mechanism 4 is in a work position, the additional hydraulic ram 50a is connected to tank. Thus, the additional hydraulic ram 50a can lengthen or shorten according to the orientation of the cutting mechanism 4 resting on the ground. The additional hydraulic ram 50a is, for example, at maximum extension when the cutting mechanism 4 rests on ground with practically no unevennesses, as can be seen in FIG. 1. The link rod 52 is articulated to the carrying beam 5 in such a way as to allow said cutting mechanism 4 to pivot about the axis K of the first articulation 6a without, however, causing said additional hydraulic ram 50a to shorten or lengthen. The relative and variable orientation between the respective axes (not depicted) passing through the articulations 54-53 and the articulations 53-51b allows the distance between the articulations 54 and 51b to be altered. Such an alteration corresponds to the pivoting of the cutting mechanism 4 about the axis K. The variable inclination between the link rod 52 and the additional hydraulic ram 50a thus allows the cutting mechanism 4 to conform to the unevennesses of the ground, avoiding tension or thrust on the rod 51.

According to one advantageous embodiment of the mower 2 according to the invention (FIG. 3b), the additional hydraulic ram 50a comprises one return means 55 able to store up energy as said additional hydraulic ram 50a shortens. The return means 55 consists, for example, of a chamber 56 filled with air which is compressed as the additional hydraulic ram 50a shortens. The return means 55 allows the rod 51 to emerge from its cylinder when the supply pipe for the additional hydraulic ram 50a is connected to tank. The energy stored up by the return means 55 is then restored with the lengthening of the additional hydraulic ram 50a. The cutting mechanism 4 is then automatically returned to its initial orientation corresponding to a work position. The chamber 56 may, according to another embodiment, be replaced by any other return means, such as an elastic means of the spring type.

FIG. 4a depicts a mower 2 according to the invention, in a transport position. The tractor 1 is shown only in part and the cutting mechanism 4 is pivoted toward the rear of the tractor to align itself approximately with the direction of forward travel A. The additional hydraulic ram 50a is preferably retracted to the maximum extent and the hydraulic lifting ram 21–22–23 is at maximum extension. In this transport position, the carrying beam 5 rests against the hitching structure 3. This resting is achieved by means of an additional stop 5c (FIG. 4b) when the lifting member 20 is at maximum extension. Furthermore, the mower 2 is designed to position the carrying beam 5 against this additional stop 5c at the end of pivoting about the axis I into the transport position.

The damping member 30 then fully fulfills its function to, in particular, damp out the approximately vertical accelerations of the cutting mechanism 4. The various articulations of the hitching structure 3 and, in particular, the lower hitching points 1a, 1b and the upper draw-bar 1c are thus less heavily loaded when the mower 2 is being transported.

The mower 2 according to the invention also comprises a retractable stand 60 so that said mower 2 can be uncoupled and set down.

FIG. 5a and 5b depict the mower 2 according to the invention once it has been uncoupled from the tractor 1. In this position, the stand 60 extends approximately vertically and rests on the ground.

Advantageously, the axis of the articulation 24 is in a plane of extension offset by a certain distance from the plane of extension containing the axis J. This offset I1, depicted in FIG. 5a, allows the movement of the carrying beam 5 to be oriented in such a way that this beam positions itself behind and against a part of the hitching structure 3 with the additional stop 5b.

The positioning of the additional stop 5b therefore depends directly on the offset I1.

The mower 2 also has a hole 1e for mounting one end of the upper draw-bar 1c. The hole 1e is offset, in a horizontal direction parallel to the direction of forward travel A, with respect to the lower hitching points 1a, 1b. This offset I2, in conjunction with a given height of the stand 60, makes it possible, when the mower 2 is resting on the ground, for the hitching structure 3 to be positioned optimally with respect to the carrying beam 5.

What happens is that the offsets I1, I2, the height of the stand 60 and the positioning of the additional stop 5c allow the mower 2 to be coupled optimally to the tractor 1, because the length ways adjustment of the upper draw-bar 1c, which needs to be done for said coupling, then corresponds to an optimum setting for positioning the cutting mechanism 4 in a lateral work position. Advantageously, the carrying beam 5 rests on the hitching structure 3 with the additional stop 5c, only in a folded backward position. The lifting member 20 at maximum extension allows the additional stop 5c to be kept against the hitching Structure 2 when the mower 2 is coupled to the tractor 1. The hitching structure 3 is designed so that the additional stop 5c is no longer operational when the carrying beam 5 is in a lateral work position. Obviously, the carrying beam 5 has to be able to pivot about the axis J during work. The offset I1 and therefore the positioning of the articulation 24 with respect to the axis J is chosen to give the carrying beam 5 an optimum orientation when pivoting between a transport position and a work position of the cutting mechanism 4.

Furthermore, when setting down the mower 2 according to the invention, the hydraulic lifting ram 21–22–23 and the additional hydraulic ram 50a are connected to tank. The cutting mechanism 4 then rests directly on the ground. The hitching structure 3 rests on the ground via the stand 60, and the carrying beam 5 rests against the hitching structure 3 with the additional stop 5c (see, for example, FIG. 5b). Thus, when the mower 2 is coupled to the tractor 1, it will no longer be necessary to perform a lengthways adjustment of the upper draw-bar 1c. The cutting mechanism 4 will be operational as soon as it is placed in its lateral work position. The cutterbar 4a supporting the disks 9 therefore has an optimum inclination with respect to the ground and with respect to the fodder which is to be mown.

When the cutting mechanism 4 is resting on the ground in its work position, the damping member 30 is inoperative and it is the lightening ram 3b that makes it possible to select the extent to which the cutting mechanism 4 conforming to the ground and also the damping. In transport, the lightening ram 3b is inoperative and it is the oleopneumatic damping ram 31–32–33 which becomes active. This represents an appreciable advantage.

What is claimed as new and desired to be secured by Letters Patent of the United States is:

1. Mower comprising:
   a cutting mechanism which, during work, extends transversely to a direction of work,
   a hitching structure connected to a motor vehicle,
   a carrying beam connected, on one hand, to the cutting mechanism by means of a first articulation, an axis of which is directed forward, and, on another hand, to the hitching structure by means of a second articulation, an axis of which is directed forward and of a third articulation, an axis of which is directed upward, which allows the second articulation to pivot with respect to the hitching structure,
   positioning means acting on the carrying beam to allow said carrying beam and the cutting mechanism to be moved jointly between at least one transport position and one other position, and vice versa, by pivoting of the carrying beam and of the cutting mechanism about the axis of the third articulation, and
   a lifting member acting on the carrying beam to allow said carrying beam and the cutting mechanism to be moved simultaneously between a work position and a maneuvering position,
   wherein the lifting member is associated with a damping member acting on the carrying beam so as to absorb abrupt movements of said carrying beam and of the cutting mechanism with respect to the hitching structure when said carrying beam and said cutting mechanism are in the maneuvering position respectively in a transport position.

2. Mower as claimed in claim 1, wherein the lifting member and the damping member are mounted between the hitching structure and the carrying beam.

3. Mower as claimed in claim 1, wherein the lifting member and the damping member are mounted in series.

4. Mower as claimed in claim 1, wherein the lifting member is a hydraulic lifting ram.

5. Mower as claimed in claim 1, wherein the damping member is an oleopneumatic damping ram.

6. Mower as claimed in claim 1, wherein the lifting member is a hydraulic lifting ram and the damping member is an oleopneumatic damping ram.

7. Mower as claimed in claim 6, wherein the hydraulic lifting ram and the oleopneumatic damping ram are made with a common body which has two chambers, a first ram rod emerging from one of the chambers being articulated to the hitching structure, a second ram rod emerging from the other chamber being articulated to the carrying beam.

8. Mower as claimed in claim 7, wherein the first ram rod is that of the hydraulic lifting ram and the second ram rod is that of the oleopneumatic damping ram.

9. Mower as claimed in claim 7, wherein the second ram rod is connected to the carrying beam by means of a connecting rod mounted so that it can pivot on said carrying beam and that it can bear against a complementary stop secured to said carrying beam.

10. Mower as claimed in claim 1, and which additionally comprises a means for locking the pivoting of the cutting mechanism about the axis of the first articulation.

11. Mower as claimed in claim 10, wherein the locking means comprises an additional hydraulic ram mounted between the cutting mechanism and the carrying beam.

12. Mower as claimed in claim 11, wherein the additional hydraulic ram is connected to the carrying beam by means of a link rod mounted so that it can pivot on said carrying beam.

13. Mower as claimed in claim 12, wherein the lifting member is a hydraulic lifting ram.

14. Mower as claimed in claim 13, wherein the hydraulic lifting ram and the additional hydraulic ram are supplied in parallel, so as to cause said hydraulic lifting ram to extend and said additional hydraulic ram to shorten.

15. Mower as claimed in claim 14, wherein the additional hydraulic ram comprises a return means capable of storing up energy as said additional hydraulic ram shortens.

16. Mower as claimed in claim 15, wherein said return means comprises a chamber filled with air which is compressed as the additional hydraulic ram shortens.

17. Mower as claimed in claim 1, wherein the positioning means are capable of pivoting the carrying beam and the cutting mechanism horizontally toward the rear of the motor vehicle.

18. Mower as claimed in claim 1, and which comprises a means of lightening the cutting mechanism to reduce a pressure with which said cutting mechanism rests on a ground.

19. Mower as claimed in claim 18, wherein the lightening means acts between the hitching structure and the carrying beam.

20. Mower as claimed in claim 18, wherein the lightening means is an oleopneumatic lightening ram.

21. Mower as claimed in claim 1, and which is a disk mower.

22. Mower as claimed in claim 1, and which is a disk mower with members for treating a cut product.

* * * * *